March 14, 1961 T. ENGEL 2,974,883

PROCESS FOR PULVERIZING THERMOPLASTIC MATERIAL

Filed Oct. 5, 1955

*INVENTOR.*
THOMAS ENGEL
BY Toulmin & Toulmin

ATTORNEYS

United States Patent Office 2,974,883
Patented Mar. 14, 1961

2,974,883

PROCESS FOR PULVERIZING THERMOPLASTIC MATERIAL

Thomas Engel, Offenbach am Main, Germany, assignor, by mesne assignments, to Vasco Industries Corp., New York, N.Y., a corporation of New York Filed Oct. 5, 1955, Ser. No. 538,648

10 Claims. (Cl. 241—17)

The invention relates to a process for the pulverization of thermoplastic materials, in particular as material for the flame spraying process. It is chiefly polyethylene that is used for this.

For the spraying of plastics according to the flame spraying process the granule size of the material should not exceed a given value. For the material mentioned this value is about 0.4 mm.

There exist already various possibilities for processing plastics to a material having the required degree of fineness, but the known processes are either too expensive or involve other undesirable drawbacks.

According to one known method, the plastic was pulverized or comminuted by making it brittle by means of a liquid nitrogen bath, the temperature of which is about —200° C., and grinding the brittle material in a peg roller-mill.

According to another method the material in the form of blocks was ground with the aid of a grinding machine, for which corresponding cooling had to be provided.

Finally it is possible to process the material according to the so-called "jet" process, in which the material is liquefied by heat application, forced through a nozzle, and beyond the nozzle sprayed through a transversely directed air current, and collected.

The use of a cooling as well as a heating device renders the known process expensive, while in the case of grinding the risk of fouling and clogging of the grinding machine is an additional drawback, because the material becomes plastic and smears already at relatively low temperatures.

Now it has been found that the pulverization or comminution can be effected in a manner which is very simple and at least as effective as the known methods, but appreciably cheaper.

According to the invention this is done by rasping the material at a temperature within the softening range and at the lower side of it. Preferably the material is comminuted with continuous air-cooling between a high-speed rotor and a stationary sieve casing closely surrounding the rotor, which sieve casing is made of perforated plate with perforations inclined to the surface of the plate, while provision should be made for the temperature on the sieve to be within the softening range of the plastic in question at the lower side of that range.

A particularly suitable apparatus for carrying out this process is a mill, the rotor of which is provided with rubbing members, while the inner surface of the sieve casing has the form of a rasp. Further, with a view to effecting the air-cooling, the mill is suitably connected to an exhauster.

The air-cooling by means of this exhauster must be controllable. Depending on factors such as the load on the mill, the speed, the shape of the rubbing members or hammers, the flow of cooling air, etc., a certain temperature will occur on the rasp.

This temperature is decisive in order to make it possible to obtain a good granular product. This temperature should lie at the beginning of the softening range of the plastic to be ground. If the temperature of the rasp is too low, no powdered product is obtained, but fine threads are formed having the length of the dimensions of the sides of the plastic particles rubbing against the rasp. Such threads are not suitable for use in the flame spraying process inasmuch as it is necessary to obtain a freely flowable granular powder.

If the temperature of the rasp is too high, fusion phenomena will appear, as a result of which the mill will soon be clogged.

It has been found suitable to perform the measurement of the temperature in the air current which has passed through the rasp. By experiment, it can soon be ascertained for each type of mill what is the correlation between the temperature of this air current and the temperature on the rasp.

Surprisingly it appears possible to transform a thermoplastic material into a good granular product by grinding it on a rasp at a temperature within its softening range.

It has, for example, been found that for Lupolen H-type polyethylene the right grinding temperature is about 120° C. For a given type of mill and a continuously controlled supply of the product to be ground this grinding temperature can be adjusted very simply by controlling the flow of cooling air.

The drawing illustrates by way of example an embodiment of the apparatus for carrying out the process according to the invention.

Figure 1:
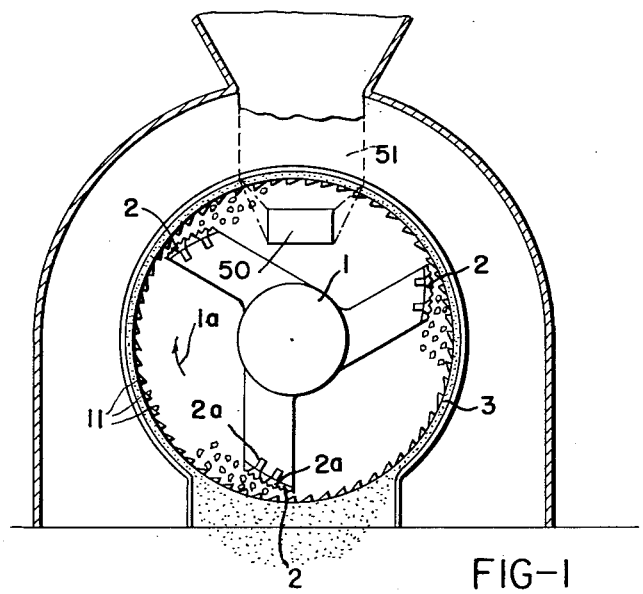
Figure 1 is a diagrammatic front sectional view of the mill.

According to Figure 1 the mill has a rotor 1 with rubbing members 2. The rubbing members 2 are replaceable and can be connected with the rotor in a known manner, e.g., by means of screws 2a.

The rotor 1 revolves at high speed in the direction of arrow 1a in a stationary sieve casing 3, which closely envelops the rotor. Material is supplied by way of an opening 50 in the back wall of the sieve casing, which opening is in communication with a vertical feed chute 51. The clearance between rotor and sieve casing should not be more than about 1 mm. The inner surface of the sieve casing has the form of a rasp. The construction is such that the perforations are inclined to the surface of the sieve casing.

For effecting feeding of the material to the comminuting zone in sieve casing 3 from the hopper 5, there is provided an inclined feeder pan 7; feeder pan 7 directs the material downwardly rearwardly (Figure 1) to a depending feeder apron designated at 9 and thence to the sieve casing entrance indicated at 11.

Figure 3:
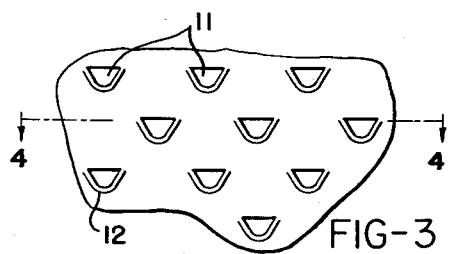
Figures 3 and 4 are diagrammatic plan and cross-sectional views, respectively, on an enlarged scale of the metal plate constituting the seive casing.
Figure 4:
Figure 5:
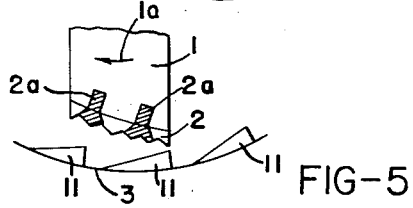
Fig. 5 is a fragmentary view, on an enlarged scale, showing the cooperation of the rotor and sieve of the mill shown in Fig. 1.

The construction is illustrated in Figures 3 and 4. The perforations 11 are punched into the plate of the sieve casing. The circumferences 12 of these perforations, however, do not lie in the plane of the sieve casing, but are inclined thereto so that a cross-section on the line 4—4 in Figure 3 takes the form of Figure 4, as is well known in the case of a kitchen grater. The width of the perforations 11 determins the granule size, which, as stated above, should be less than 0.4 mm.

In order to carry out the process according to the invention, the plastic is ground by the rubbing members 2 on the perforated metal plate of the sieve casing 3.

Figure 2:
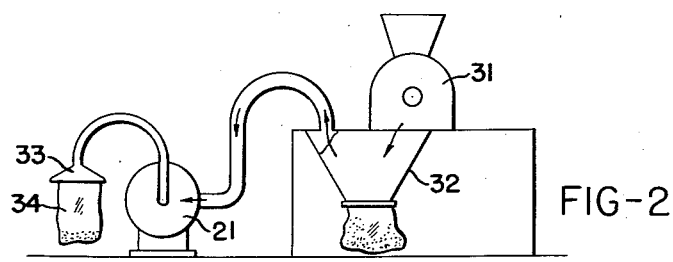
Figure 2 is a diagrammatic illustration of an arrangement of the mill in combination with the exhauster system.

Cooling is effected by means of an exhauster 21 (Figure 2) which continuously draws a current of fresh air through the mill 31. The ground material is collected underneath the mill, e.g. with the aid of a funnel 32. If necessary, a discharge conduit 33 is provided behind the exhauster, in order to carry away any ground material that may still be present in the air current. The air then escapes through the tissue of the bag 34.

The process according to the invention has the advantage that the maximum particle size can be accurately adjusted with the aid of the perforations of the sieve casing, so that there is no waste of larger granules. Further, in contrast with the known method(s), the otherwise inevitable step of super-cooling with liquid nitrogen can be omitted. As seen in Fig. 1, the rubbing members 2 continually force and scrape relatively large granules or pieces of the thermoplastic material against the inner side of the cylindrical rasping sieve 3, and small comminuted particles within the desired size limit are continually discharged through the openings of the sieve to the outer side thereof.

The apparatus for carrying out the present process may be a mill of usual construction, after insertion of a sieve casing constructed to fulfill the requirement of the invention.

It will be understood that this invention is susceptible to modification in order to adapt it to different usages and conditions, and accordingly, it is desired to comprehend such modifications within this invention as may fall within the scope of the appended claims.

I claim:

1. A process for pulverizing a normally solid synthetic polymeric thermoplastic material that softens in a range of elevated temperatures substantially above normal temperature, which comprises milling coarse granules of said material against one side of a rasping sieve maintained at a temperature within but at the lower side of said softening range, thereby comminuting said material by rasping it at the openings of said sieve, and discharging comminuted particles of said material through said openings to the opposite side of said sieve to obtain the material in the form of a freely flowable powder.

2. A process for pulverizing a normally solid synthetic polymeric thermoplastic material that softens in a range of elevated temperatures substantially above normal temperature, which comprises continually forcing and scraping coarse pieces of said material against one side of the rasping sieve maintained at a temperature within but at the lower side of said softening range, thereby comminuting said material by rasping it at the openings of said sieve, and continually discharging comminuted particles of said material through said openings to the opposite side of said sieve to obtain the material in the form of a freely flowable powder.

3. A process for pulverizing a normally solid synthetic polymeric thermoplastic material that softens in a range of elevated temperatures substantially above normal temperature, which comprises continually forcing and scraping coarse pieces of said material against one side of a rasping sieve maintained at a temperature within but at the lower side of said softening range, thereby comminuting said material by rasping it at the openings of said sieve, continually discharging comminuted particles of said material through said openings to the opposite side of said sieve to obtain the material in the form of a freely flowable powder, and maintaining said sieve at said temperature by continuously flowing cooling air through said openings.

4. A process for pulverizing a normally solid synthetic polymeric thermoplastic material that softens in a range of elevated temperatures substantially above normal temperature, which comprises continually milling coarse particles of said material against one side of a rasping sieve maintained at a temperature within but at the lower side of said softening range, thereby comminuting said material by rasping it at the openings of said sieve, continually discharging comminuted particles of said material through said openings to the opposite side of said sieve to obtain the material in the form of a freely flowable powder, continuously flowing cooling air through said openings in the direction of discharge of said particles, and maintaining said sieve at said temperature by regulating the cooling air flow according to the temperature of the air flowing away from said sieve.

5. A process for pulverizing polyethylene, which comprises milling the polyethylene against one side of a rasping sieve maintaining at a temperature within but at the lower side of the softening range of the polyethylene, thereby comminuting the polyethylene by rasping it at the openings of said sieve, and discharging comminuted particles of the polyethylene through said openings to the opposite side of said sieve.

6. A process for pulverizing polyethylene, which comprises continually forcing and scraping pieces of the polyethylene against one side of a rasping sieve maintained at a temperature within but at the lower side of the softening range of the polyethylene, thereby comminuting the polyethylene by rasping it at the openings of said sieve, continually discharging comminuted particles of the polyethylene through said openings to the opposite side of said sieve, and maintaining said sieve at said temperature by continuously flowing cooling air through said openings.

7. A process for pulverizing polyethylene, which comprises continually forcing and scraping pieces of the polyethylene against one side of a rasping plate maintained at a temperature within but at the lower side of the softening range of the polyethylene and formed with perforations not exceeding 0.4 mm. in width bordered by plate portions protruding to said one side from the body of said plate, thereby comminuting the polyethylene by rasping it on said plate portions, continually discharging through said perforations to the opposite side of said plate particles of the polyethylene not exceeding 0.4 mm. in size, continuously flowing cooling air through said perforations in the direction of discharge of said particles, and maintaining said sieve at said temperature by regulation of the cooling air flow.

8. A process for pulverizing a polyethylene that begins to soften at a temperature of approximately 120° C., which comprises continually forcing and scraping pieces of said polyethylene against and around the inner side of a cylindrical rasping plate maintained at a temperature of approximately 120° C. and formed with perforations not exceeding 0.4 mm. in width bordered by plate portions protruding to said inner side from the body of said plate, thereby comminuting said polyethylene by rasping it on said plate portions, continually discharging through said perforations to the outer side of said plate particles of said polyethylene not exceeding 0.4 mm. in size, continuously flowing cooling air through said perforations in the direction of discharge of said particles, and maintaining said plate at said temperature by regulation of the cooling air flow.

9. A process for pulverizing a normally solid synthetic polymeric thermoplastic material that softens in a range of elevated temperatures substantially above normal temperature, which comprises the steps of milling coarse particles of said material against one side of a rasping sieve, said sieve maintained at a temperature within but at the lower side of said softening range, said temperature also being sufficiently high to prevent the formation of threads of the thermoplastic material and sufficiently low to prevent fusion and sticking of said thermoplastic material, so that said thermoplastic material is comminuted into a product having a particle size not exceeding about 0.4 mm. at the openings of said sieve; and discharging said product through said openings to the opposite side of said sieve.

10. A process for pulverizing a normally solid synthetic polymeric thermoplastic material that softens in a range of elevated temperatures substantially above normal temperature, which comprises the steps of continually forcing and scraping coarse pieces of said material against one side of a rasping sieve, said side having sharp lipped perforations disposed inwardly and the circumference of said perforations disposed in a plane inclined to the sieve proper; said sieve maintained at a temperature within but at the lower side of said softening range, said temperature also being sufficiently high to prevent the formation of threads of the thermoplastic material and sufficiently low to prevent fusion and sticking of said thermoplastic material, so that said thermoplastic material is comminuted into a product having a particle size not exceeding about 0.4 mm. at the openings of said sieve; and discharging said product through said openings to the opposite side of said sieve.

References Cited in the file of this patent

UNITED STATES PATENTS

| | | |
|---|---|---|
| Re. 9,383 | Tompkins | Sept. 21, 1880 |
| 656,297 | Morris | Aug. 21, 1900 |
| 669,465 | Murphy | Mar. 5, 1901 |
| 868,617 | Scozzari | Oct. 15, 1907 |
| 926,801 | Axtell | July 6, 1909 |
| 1,359,426 | Plaisted | Nov. 16, 1920 |
| 1,569,561 | Miller | Jan. 12, 1926 |
| 1,666,014 | Kershner | Apr. 10, 1928 |
| 1,782,296 | Goldstein | Nov. 18, 1930 |
| 1,795,792 | Nielson | Mar. 10, 1931 |
| 1,945,054 | MacGregor et al. | Jan. 30, 1934 |
| 2,013,808 | Robinson | Sept. 10, 1935 |
| 2,215,226 | Meyer | Sept. 17, 1940 |
| 2,364,101 | Schurman | Dec. 5, 1944 |
| 2,400,382 | Arnold | May 14, 1946 |
| 2,461,089 | Smidth | Feb. 8, 1949 |
| 2,587,020 | Wicker et al. | Feb. 26, 1952 |
| 2,726,045 | Hinerfeld | Dec. 6, 1955 |
| 2,833,484 | Gooding | May 6, 1958 |

FOREIGN PATENTS

| | | |
|---|---|---|
| 305,374 | Switzerland | May 2, 1955 |
| 686,374 | Great Britain | Jan. 21, 1953 |
| 735,600 | Great Britain | Aug. 24, 1955 |